US006371439B1

(12) United States Patent
Trevisan

(10) Patent No.: US 6,371,439 B1
(45) Date of Patent: Apr. 16, 2002

(54) DEVICE FOR ADJUSTING THE CENTRAL POSITION OF THE PISTONS AND THE ANGULAR POSITION OF THE PINION IN A VALVE DRIVING ACTUATOR

(76) Inventor: Giovanni Trevisan, Via Alfieri, 24, 20090, Trezzano sul Naviglio (Milano) (IT)

( * ) Notice: Subject to any disclaimer, the term of this patent is extended or adjusted under 35 U.S.C. 154(b) by 0 days.

(21) Appl. No.: 09/217,484

(22) Filed: Dec. 21, 1998

(30) Foreign Application Priority Data

Jul. 29, 1998 (IT) ........................................ MI98A1766

(51) Int. Cl.[7] ................................................ F16K 31/12

(52) U.S. Cl. ......................... 251/58; 251/285; 251/288; 92/13.5; 92/13.8

(58) Field of Search ................................ 251/288, 285, 251/250, 58; 92/13.5, 13.8

(56) References Cited

U.S. PATENT DOCUMENTS 3,148,595 A * 9/1964 Looney ................... 92/13.5 X
4,564,169 A * 1/1986 Nordlund ..................... 251/58
4,566,670 A * 1/1986 Nordlund .................. 25/288 X
4,651,626 A * 3/1987 Messina ..................... 92/13.6
4,949,936 A * 8/1990 Messina ...................... 251/58
4,970,944 A * 11/1990 Killian ....................... 92/13.6
5,014,598 A * 5/1991 Champagne ................ 91/13.5
5,325,888 A * 7/1994 Stary ........................ 251/58 X
5,467,967 A * 11/1995 Gillooly .................... 251/285

* cited by examiner

*Primary Examiner*—Henry C. Yuen
*Assistant Examiner*—John Bastianelli
(74) *Attorney, Agent, or Firm*—Hedman & Costigan, P.C.

(57) ABSTRACT

A device for adjusting the central position of the pistons and the angular position of the pinion in a valve driving actuator comprises a tubular body in which are tightly movably arranged a first and second pistons having opposite racks, meshing with a central pinion which can turn through discrete angles.

The main feature of the invention is that the inventive device further comprises limit means for limiting the stroke of the pistons toward the pinion, which means can be accessed from the outside of the tubular body.

3 Claims, 2 Drawing Sheets

DEVICE FOR ADJUSTING THE CENTRAL POSITION OF THE PISTONS AND THE ANGULAR POSITION OF THE PINION IN A VALVE DRIVING ACTUATOR

BACKGROUND OF THE INVENTION

The present invention relates to a device for adjusting the central position of the pistons and the angular position of the pinion in a valve driving actuator.

As is known, prior pinion-piston-rack actuators conventionally comprise a pair of pistons, rigid with related racks, and sliding in a tubular body in a meshing relationship with a central pinion, which can be turned correspondingly to a fraction of 360°, usually through 90°.

The pinion is provided for angularly driving the axis or shaft of a valve or the like and, accordingly, it must have a limited angular stroke.

In order to provide said limiting feature, it is possible to directly operate on the pinion or, possibly, on the piston-rack assembly.

In prior solutions, the above mentioned limiting effect is usually provided by limiting the outwardly displacement of the pistons.

In this connection it should be pointed out that great problems would be encountered in stopping the pistons, and consequently the pinion, during an inwardly displacement of said pistons.

SUMMARY OF THE INVENTION

The aim of the present invention is to overcome the above mentioned problems, by providing a device for adjusting the central position of the pistons in valve controlling actuators, which allows to limit the displacement of the piston toward the central pinion, in a very simple and efficient manner.

Within the scope of the above mentioned aim, a main object of the present invention is to provide such a device which can be easily controlled or adjusted from the outside of the actuator body, without requiring any difficult adjusting operations and the use of specifically designed tools.

Another object of the present invention is to provide such a device for adjusting the central position of the pistons in valve controlling actuators which, owing to its specifically designed construction, is very reliable and safe in operation.

Yet another object of the present invention is to provide such a device for adjusting the central position of pistons in valve controlling actuators which can be easily made starting from easily available elements and materials and which, moreover, is very competitive from a mere economic standpoint.

According to one aspect of the present invention, the above mentioned aim and objects, as well as yet other objects, which will become more apparent hereinafter, are achieved by a device for adjusting a central position of pistons and, accordingly, an angular position of a pinion in valve controlling actuators, comprising a tubular body, in which a first and second pistons are tightly slidably arranged, said first and second pistons being provided with opposite racks meshing with a central pinion, said central pinion being adapted to turn through discrete angles, characterized in that said device further comprises limiting means for limiting the displacement of a said piston toward said pinion, said limiting means being accessible from the outside of said tubular body.

BRIEF DESCRIPTION OF THE DRAWINGS

Further characteristics and advantages of the present invention will become more apparent hereinafter from the following detailed disclosure of a preferred, though not exclusive, embodiment of a device for adjusting the central position of the pistons in valve controlling actuators, which is illustrated, by way of an indicative, but not limitative, example, in the accompanying drawings, where.

DESCRIPTION OF THE PREFERRED EMBODIMENT

Figure 1:
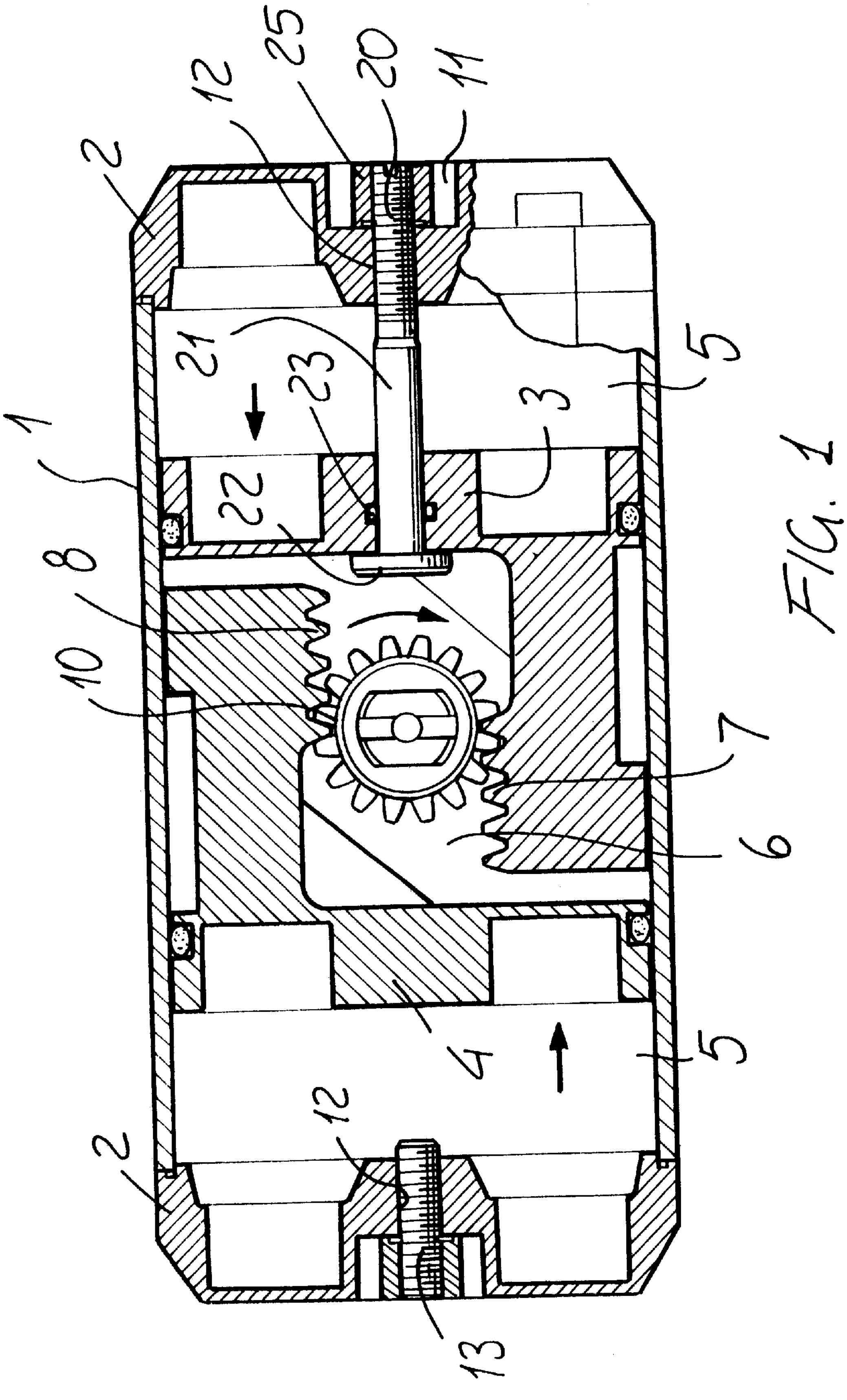
FIG. 1 is a schematic cross-sectional view illustrating a valve controlling actuator in a closure condition thereof.
Figure 2:
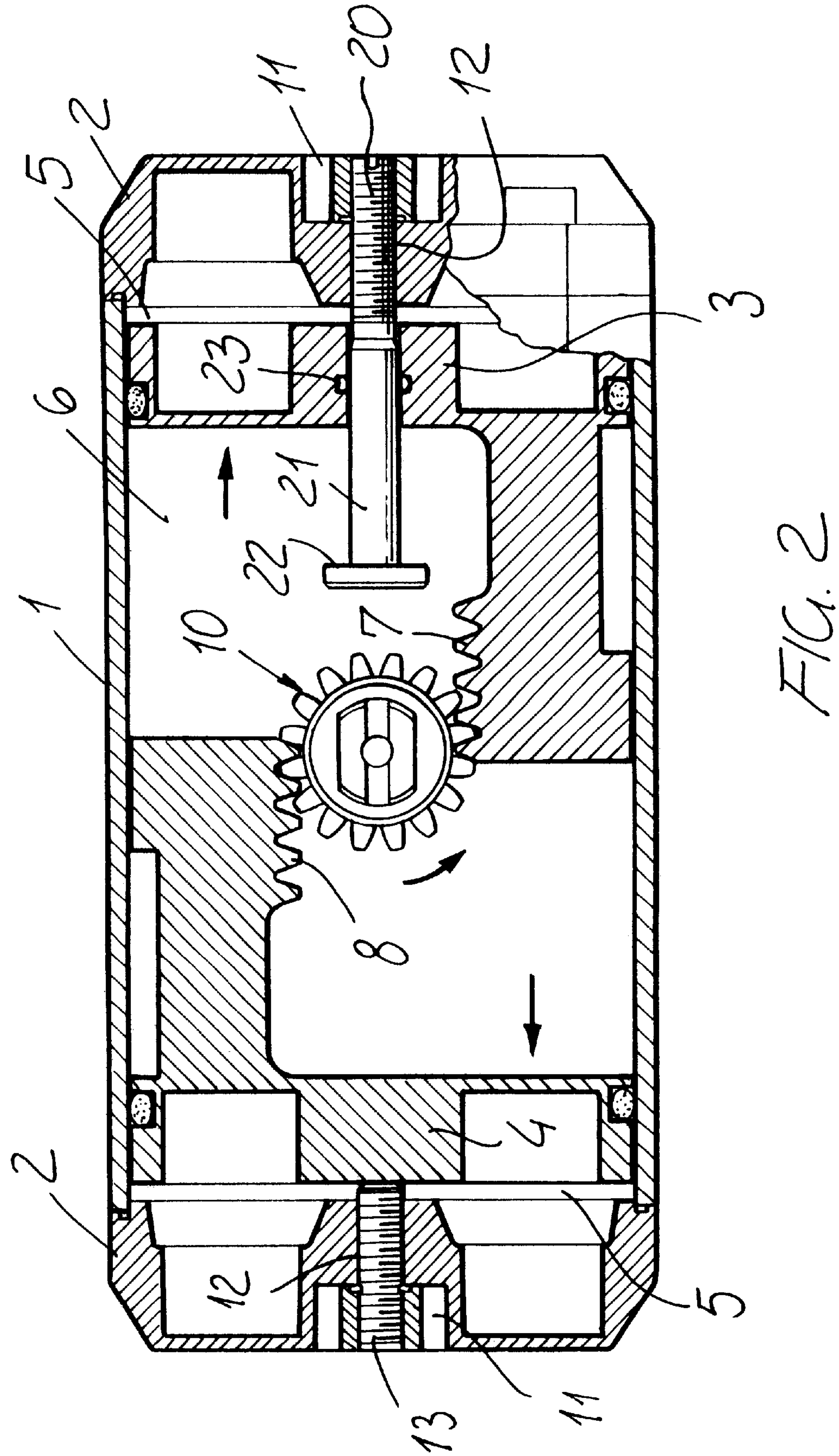
FIG. 2 illustrates the valve controlling actuator in an opening condition thereof.

With reference to the number references of the above mentioned figures, the device for adjusting the central position of pistons in valve controlling actuators, according to the present invention, comprises a tubular body 1, the end portions of which are closed by heads 2, defining an inner chamber, in which are oppositely movable arranged a first piston 3 and a second piston 4, said pistons defining in said tubular body 1 an outer chamber 5 and a central chamber 6.

In this connection, it should be apparent that the actuator can be of a so-called double effect type, the chambers 5 and 6 being alternatively caused to communicate with an operating fluid, or said actuator can also be of the so-called simple-effect type, with the operating fluid arranged in a chamber and with return resilient means provided in the other actuator chamber.

As shown, the pistons 3 and 4 are provided with related racks 7 and 8 meshing with a central pinion 10 provided for actuating a valve or the like.

At said head 2 a recess 11 in which is provided a threaded seat 12 is arranged.

In a said threaded seat, in particular the left threaded seat, as shown in the drawing, a threaded dowel 13 is arranged, and said dowel, by engaging with the piston 4, will provide a displacement limiting means for limiting the outwardly displacement of the pistons.

On the other head, a threaded portion 20 of a stem 21 is engaged in said threaded seat 12, said stem 21 ending with an enlarged head portion 22, abutting against the inner surface of the piston 3, said stem having an unthreaded inner portion adjoining said enlarged head portion tightly passing through said piston through a sealing gasket 23.

Said enlarged head portion 22 operates as a limiting element for limiting the displacement of the piston 3 toward the central portion, thereby providing an efficient and simple adjusting means for adjusting the operating stroke of the piston.

With said threaded portion 20 a locking threaded nut 25 housed inside said recess 11 is engaged.

With the disclosed arrangement, the inward displacement limiting means have a very simple construction, and they can be simply operated, by using a screw-driver of the like tools, from the outside of the actuator.

From the above disclosure it should be apparent that the invention fully achieves the intended aim and objects.

In particular, the fact is to be pointed out that a device for adjusting the central position of pistons in valve controlling actuators and the like has been provided, which directly operates on one of the pistons, thereby providing an efficient limiting function.

The invention, as disclosed, is susceptible to several modifications and variations, all of which will come within the scope of the invention.

Moreover, all of the constructional details can be replaced by other technically equivalent elements.

In practicing the invention, the used materials, as well as the contingent size and shapes, can be any, depending on requirements.

What is claimed is:

1. A device for adjusting a central position of pistons and, accordingly, an angular position of a pinion in valve controlling actuators, comprising a tubular body, in which first and second pistons are tightly slidably arranged, said first and second pistons being provided with opposite racks meshing with a central pinion, said central pinion being adapted to turn through discrete angles, said device further comprising limiting means, accessible from an outside of said tubular body, for limiting the displacement of one of said pistons toward said pinion, wherein said limiting means comprise first limit means for limiting an inward displacement of one of said pistons, said first limit means including a stem having an unthreaded portion tightly passing via a gasket through said one piston and an adjoining threaded portion which can be engaged in a threaded seat formed in a recess of a head of the actuator, said unthreaded portion being provided with an enlarged head portion which can abut against an inner surface of said one piston.

2. A device, according to claim 1, wherein said device comprises a locking nut engageable with said threaded portion of said stem in said recess.

3. A device, according to claim 1, in which said limiting means further comprises second limit means for limiting an outward displacement of the other of said pistons, wherein said second limit means includes a threaded dowel engageable in a further threaded seat formed on a head of said tubular body opposite to a head thereof including said first limit means.

* * * * *